Patented Nov. 14, 1939

2,179,605

UNITED STATES PATENT OFFICE 2,179,605

PICRYL FLUORIDE AND METHOD OF MAKING THE SAME

Laurence G. Wesson, Boston, Mass., assignor to Veader Leonard, Baltimore, Md.

No Drawing. Application February 20, 1937, Serial No. 126,937. Renewed April 8, 1939

8 Claims. (Cl. 52—5)

This invention relates to a new chemical compound particularly useful as an explosive substance, and as a material for generating a toxic gas.

My novel product is especially adapted for use as an explosive charge for bombs, hand grenades and shells, and is perhaps most effective when utilized for loading penetrating shells, such as are employed in naval warfare.

The compound forming the subject of my invention is picryl fluoride, and has the structural formula

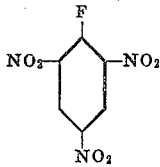

It may be regarded as related to picric acid, in which F is substituted for the OH group.

So far as I am aware, picryl fluoride is a new substance, never heretofore described in the published literature of chemistry. This is probably due to the fact that fluorine, owing to its property of attacking most of the usual chemical apparatus, is extremely difficult to handle. As hereinafter set forth, however, I have now discovered a method for the production of picryl fluoride which can not only be readily carried out in the laboratory, but which also lends itself to practical commercial manufacture.

Theoretically, three general methods suggest themselves by which picryl halogen compounds might be prepared, namely:

1. By halogenating trinitro-benzene. If an attempt is made, however, to apply this method to the production of picryl fluoride, it is found entirely impractical, both because of the almost insuperable difficulties of working with fluorine itself, and also because the formation of di-fluorides would inevitably take place, resulting in a mixture which it is impossible to satisfactorily separate.

2. By treating picric acid with phosphorous penta-halides, or similar compounds. In the case of fluorine, however, phosphorous penta-fluoride (or the like) is commercially unknown, and even its preparation in the laboratory presents extraordinary difficulties.

3. By further nitrating di-nitro-benzene halides. In this process, water is required to wash out and get rid of the nitrating acids, and the fluorine present, if a fluoride is used, would react with this water to form picric acid and hydrofluoric acid in solution.

I have now discovered and developed a fourth method, namely substituting one halogen for another by double decomposition, and have successfully applied it to the production of picryl fluoride. I find, however, that this method can be carried out only when substituting a lighter for a heavier halogen. Thus the fluorine of some fluoride may be substituted for the chlorine of picryl chloride.

My novel process for carrying out this method is illustrated by the following example:

To a boiling solution of picryl chloride in acetic acid, sodium fluoride is added in the following manner. An excess of dry NaF powder is placed in a syphon bucket into which the condensed acetic acid refluxes. The NaF is gradually dissolved by the hot acetic acid, and is in that way gradually carried into the picryl chloride solution. As an example of the relative amounts of materials used, 3 gm. of picryl chloride may be employed with 50 cc. of glacial acetic acid, and 3 gm. of NaF placed in the syphon bucket. After 4 hours of refluxing, the main portion of the acetic acid is distilled off, and may be used for the next batch. The residue in the still is then filtered while hot to remove, as far as possible, the inorganic salts such as NaCl, NaF and NaAc, that are present. The filtrate is spread over a plate or drum in the form of a thin film, and the remaining acetic acid removed therefrom by passing thereover a slow current of heated dry air, preferably under reduced pressure, and at a temperature preferably not exceeding 100° C.

After cooling, the product is scraped off of the plate or drum, and is ready for use.

The above mentioned inorganic salts which are filtered out, contain picryl fluoride and acetic acid adhering to them, and may be added to the next batch of fresh NaF in the syphon bucket.

It will be noted that in this process, there is no loss of picryl compounds, and the acetic acid may be re-used indefinitely, with but small loss.

Instead of acetic acid, other solvents such, for example, as formic or propionic acids can be used.

In place of NaF, it is theoretically possible to employ KF, but the former is preferable commercially because the latter is not only more costly, but is also hygroscopic in its nature, and therefore impractical.

The product as prepared by the above described process is somewhat impure, containing a few percent of inorganic salts, and also 2 or 3 percent of the unconverted picryl chloride. This impurity, however, is unimportant, so far as concerns the effectiveness of the product as an explosive, or as a material for generating toxic gas.

The unpurified product, picryl fluoride, is a brownish yellow solid, resembling picryl chloride in appearance. Its melting point is around 150°–160° C. It does not readily explode by percussion, but explodes violently by detonation. It also explodes when heated to a high temperature.

I have found by relative tests that the explosive power of my new product picryl fluoride, is approximately equal to that of picryl chloride, both being about the same as picric acid and somewhat greater than trinitro-toluene.

As to the production of a toxic gas when exploded or decomposed, picryl fluoride contains about 8.6% by weight of hydrofluoric acid. 1 lb. of picryl fluoride yields 1.55 cu. ft. of hydrogen fluoride gas, at atmospheric pressure. Approximately 12% of all gases formed by the explosion of picryl fluoride is hydrogen fluoride, so that this highly poisonous substance is present in substantial amounts in the products of the decomposition.

The hydrogen fluoride, mingled with the hot gases from the explosion, would be in the monomolecular form, HF, which is somewhat lighter than air, but on cooling to ordinary temperatures, the molecules will combine and form aggregates, to a large extent, so that the resulting hydrogen fluoride will have a density considerably greater than that of air.

As above mentioned, picryl fluoride is particularly effective when used as an explosive charge for penetrating shells such as employed in naval warfare. A shell, loaded with this material, and exploding inside of a ship or other enclosed space, would instantly fill the interior with highly toxic hydrogen fluoride.

Considered as a material for generating noxious gases from charges in shells or the like, my novel product has the great advantage over other known materials that it is itself explosive, and hence the entire charge of the shell may consist of the gas generating material, no auxiliary explosive substance being required.

While the invention has been described as particularly adapted for use as an explosive, it will, of course, be understood that it is not limited to such use but that the product may have various industrial applications, and I, therefore, claim the product broadly, regardless of the particular purpose for which it may be employed.

What I claim is:

1. A new product comprising substantial proportions of picryl fluoride.
2. A new product consisting essentially of picryl fluoride.
3. An explosive comprising picryl fluoride.
4. An explosive comprising a mixture of picryl fluoride and chloride.
5. A product comprising a mixture of picryl fluoride and chloride.
6. The method of producing picryl fluoride which comprises replacing the chlorine of picryl chloride with fluorine.
7. The method of producing picryl fluoride which comprises replacing the chlorine of picryl chloride with fluorine by means of an alkali fluoride.
8. The method of producing picryl fluoride which comprises treating picryl chloride with an alkali fluoride by means of a common solvent.

LAURENCE G. WESSON.